United States Patent [19]

DeLuca

[11] Patent Number: 4,972,978

[45] Date of Patent: Nov. 27, 1990

[54] DISPENSER HAVING AN IMPROVED METERING CHAMBER

[75] Inventor: Raymond F. DeLuca, Stamford, Conn.

[73] Assignee: Georgia-Pacific Corporation, Atlanta, Ga.

[21] Appl. No.: 283,850

[22] Filed: Dec. 13, 1988

[51] Int. Cl.$^5$ ............................................. B65D 88/54
[52] U.S. Cl. .................................. 222/341; 222/181; 222/361
[58] Field of Search ............... 222/181, 450, 451, 453, 222/309, 354, 355, 344, 361, 362, 341, 339, 337, 336; 137/843, 852, 853, 847

[56] References Cited

U.S. PATENT DOCUMENTS

| 1,986,343 | 1/1935 | Iskyan | 222/341 |
| 2,709,025 | 5/1955 | Scott | 222/341 |
| 3,540,630 | 11/1970 | Brown et al. | 222/153 |
| 4,036,406 | 7/1977 | Jespersen et al. | 222/181 |
| 4,360,130 | 11/1982 | Nishimura et al. | 222/181 |
| 4,493,440 | 1/1985 | von Buelow et al. | 222/181 |
| 4,570,826 | 2/1986 | Fattori | 222/153 |

FOREIGN PATENT DOCUMENTS

| 23975 | 7/1980 | European Pat. Off. |  |
| 263929 | 2/1911 | Fed. Rep. of Germany |  |
| 561433 | 10/1923 | France | 222/361 |
| 28150 | 11/1925 | France | 222/361 |
| 947101 | 1/1964 | United Kingdom |  |

Primary Examiner—Michael S. Huppert
Assistant Examiner—Kenneth Noland
Attorney, Agent, or Firm—Banner, Birch, McKie & Beckett

[57] ABSTRACT

A cylinder including an opening and inlet and outlet ports. A biasing member, within the cylinder, includes a first end fixed relative to the cylinder and a second end closer to the opening. A rotatable slidable member includes an angled first surface on which the biasing member second end is disposed, an opposite second surface closer to the opening and a variable width surface for closing the inlet port. A piston has a rotatable rod and a flange surface which faces the second surface of the slidable member. On the piston rod is at least one hinging member. A protrusion fixed relative to the cylinder pushes the hinging member when the piston is moved so that this hinging member can close the outlet port. A plurality of these hinging members define an umbrella-shaped seal for losing the port at various rotational positions of the rod. An O-ring seal is disposed between both the piston flange surface and the slidable member second surface. This seal continuously engages a circumferential segment of the cylinder interior surface when the piston is prevented from movement, the slidable member second surface is exerting a force on the seal and a piston flange surface is exerting an opposing force on the seal and continuously engages a circumferential segment of the cylinder interior surface when the piston is moved, a piston flange surface is exerting a force on the seal and the slidable member second surface is exerting an opposing force on the seal.

40 Claims, 5 Drawing Sheets

DISPENSER HAVING AN IMPROVED METERING CHAMBER

BACKGROUND OF THE INVENTION

This invention is directed towards structures for dispensing liquid, pastes, creams, pellets or the like. In particular this invention is directed towards an improved metering chamber or pump structure for the dispenser.

The prior art referenced herein discloses metering chambers having seals disposed relative to piston assemblies which are designed to prevent material within the dispenser such as paste, creams, liquid, pellets or the like (hereinafter liquid) from leaking out from an outlet port or entering through an inlet port when not desired and from leaking out from the area where a handle actuated piston assembly rod enters the metering chamber. Leaking from metering chambers is still a problem of major concern, however. Generally, prior art soap dispensers use elastic seals of various designs which may also be specially compounded to attempt to withstand the degrading effect of harsh chemicals used in many soap formulas. These seals normally rest in grooves on a piston assembly and slide with a piston assembly. These seals depend on their elastic memory to be compressed against a chamber interior surface in order to create a sealing surface. They do not receive compressive forces from the piston assembly or any elements disposed on the piston assembly. With time and effect of many soap products of this type, the seal will physically change and loose its ability to act as an effective sealing member. These seals sliding on grooves of a piston assembly are used to attempt to close off the handle receiving end of the metering chamber and also sometimes the inlet and outlet ports on the chamber.

U.S. Pat. No. 4,493,440 to von Buelow et al. provides examples of such seals. von Buelow includes one seal to close an outlet port in non-actuated state and one seal to continually close a gap at the handle end of a pump chamber. The pump chamber of von Buelow includes two different interior surface diameter sections. The larger interior surface diameter section includes an inlet port with a narrower interior surface diameter section including an outlet port. A spring in von Buelow is disposed outside the pump chamber between a stroke adjustor ring (for adjusting the discharge volume) on the piston rod and a lever. During the static state (FIG. 2), an uncompressed first X-gasket disposed in the groove of the piston closes off the dispenser outlet port. The seal at the handle end of the chamber of von Buelow is made by an uncompressed second X-gasket in the groove of the piston against the larger diameter section of the cylinder. During the dynamic state (FIG. 3), the piston rod closes off the inlet port as it moves the front portion of the piston rod and the first gasket forward to open the outlet port and to dispense one of three different discharge volumes of material out of the cylinder.

Figures 2, 3:
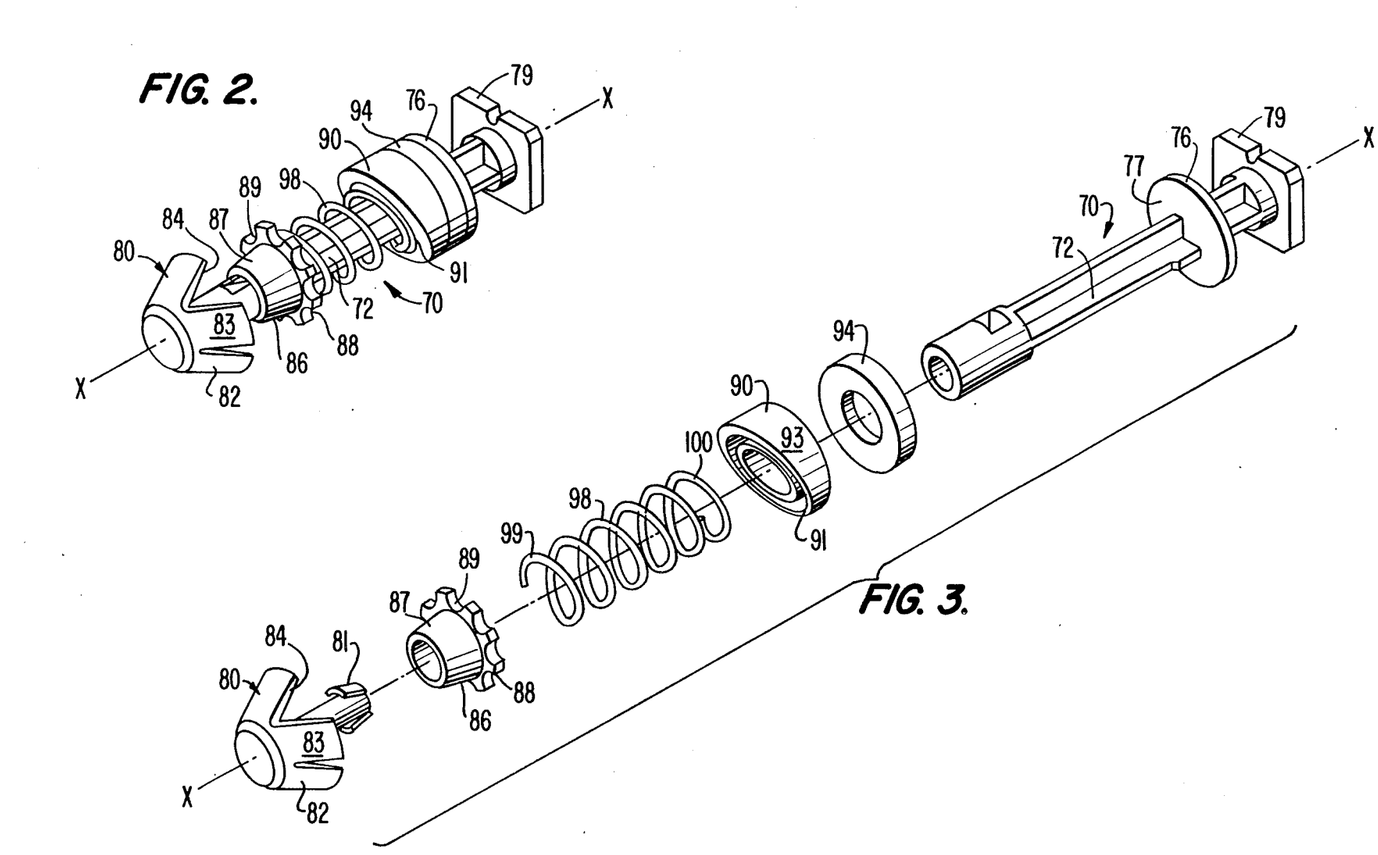
FIG. 2 is a perspective view of the internal elements of the metering chamber of FIG. 1.
FIG. 3 is an exploded perspective view of the metering chamber internal elements of FIGS. 1 and 2.

U.S. Pat. No. 4,036,406 to Jespersen and DeLuca discloses a single diameter pump cylinder with an inlet port and an outlet port. As illustrated in FIG. 2 of the patent to Jespersen and DeLuca, at the outlet port a nozzle assembly is retained for dispensing liquid when desired and preventing liquid from leaking when no dispensing is desired. The piston assembly attempts to seal off the handle end of the piston with an uncompressed O-ring and groove. In the dynamic state, the piston assembly moves to seal off the inlet port. The spring is compressively biased outside the pump cylinder between a structural support component surrounding the open end of the cylinder and the axially-directed inward face of the piston indexing head.

Also in the patent to Jespersen and DeLuca is a means for adjusting the maximum output of the dispenser to any one of four different volumes. To achieve this function the liquid contacting face of the piston is angled with respect to the piston central axis and two side surfaces of a square piston indexing head of the piston are held in place by indexing tabs of a pivoting handle. Consequently, the piston can be retained in one of four rotational positions so that the position of the piston within the cylinder at which the inlet port will be closed is varied due to the non-perpendicular liquid contacting face of the piston.

To overcome the deficiency of depending on the elastic memory of seals to compress and recover in order to create a tight sealing surface, the present invention is directed towards a very simple mechanical sealing means which depends on a mechanical compressive method to create a seal. Since it is not effected by the harsh elements associated with such systems, the present invention can then allow use of soft inert materials as part of the sealing means.

SUMMARY OF THE INVENTION

It is an object of this invention to improve the ability of the metering chamber or pump to prevent seepage from the piston receiving end of a cylinder, the inlet port or the outlet port, either singularly or in combination.

It is another object of this invention to place the seal which is at the opening of the piston receiving cylinder under mechanically compressive forces to create a tighter seal and overcome reliance on the elastic memory of a seal.

It is a further object of this invention to place seals having a hinging structure under a mechanical force to substantially close a metering chamber port.

It is still a further object of the present invention to provide improved mechanically activated seals while also providing the capability to dispense a predetermined amount of liquid.

An embodiment of the dispensing apparatus comprises a cylinder including an interior surface defining a circumference of the cylinder and having an opening at one end of the cylinder. At least one biasing member is disposed within the cylinder and the biasing member includes a first end which is in a substantially fixed position relative to the cylinder and an opposite second end being closer to the cylinder opening than the biasing means first end is to the cylinder opening. A piston assembly is disposed for being partially received in the cylinder through the cylinder opening. The piston assembly includes a surface facing the second end of the biasing member. The piston assembly also includes a socket or the like, disposed exterior of the cylinder, for receiving an actuating force to move the piston assembly surface in a direction towards the fixed position first end of the biasing member. Also included is a surface, a protrusion or the like for stopping movement of the piston assembly when the piston assembly actuating force receiving means moves a predetermined distance away from the cylinder opening.

In addition, a seal is disposed within the cylinder interior surface and between the piston assembly surface and the biasing member second end. This seal continuously engages a circumferential segment of the cylinder interior surface when the piston assembly is prevented from movement by the stopping wall or protrusion, the biasing member second end is exerting a force on the seal and the stopped piston assembly surface portion is exerting an opposing force on the seal. The seal also continuously engages a circumferential segment of the cylinder interior surface when the piston assembly is moved in response to an actuating force which is sufficient to overcome an opposing biasing member force, the moved piston assembly surface is exerting a force on the seal and the biasing member second end is exerting an opposing force on the seal.

A slidable member can be included within the cylinder. The slidable member has a first surface on which the biasing member second end is disposed along and an opposite second surface which is closer to the gap than the slidable member first surface. Therefore, the slidable member is disposed between the biasing member second end and the seal so that it is in a face-to-face relationship with the seal. In this position, the slidable member exerts a biasing member generated force on the seal when the piston assembly is prevented from movement by the piston stopping surface or protrusion and the slidable member exerts an opposing biasing member generated force on the seal when the piston assembly is moved in response to an actuating force which is sufficient to overcome an opposing biasing member force. The slidable member can also include an outer circumferential surface for substantially closing the cylinder port when the slidable member is moved within the cylinder to a predetermined position.

A hinging member can also be used to close a port. At least one hinging member, mounted on an end of piston assembly rod which is within the cylinder, can include a first surface and a second opposing surface. Further included can be a tapered ring, protrusion or the like, disposed in a substantially fixed position relative to the cylinder, for pushing the hinging member second surface in a direction approximately towards the port when the hinging member is moved with the piston assembly rod so that the hinging member first surface can be forced to substantially close the port. A plurality of these hinging members together define an umbrella-shaped seal disposed on the end of the piston assembly rod which is within the cylinder.

In an embodiment of the present invention, a handle or the like is pivotally mounted on the dispenser between the piston assembly and the piston stopping surface. The piston assembly socket engages the handle to selectively maintain the piston assembly rod in one of a plurality of predetermined positions of rotation. The slidable member rotates with the piston assembly rod and has a liquid contacting face at a non-perpendicular angle to the piston assembly rod central axis. Further at each one of the plurality of predetermined positions of rotation with which the piston assembly rod is selectively maintained, a hinging member of the umbrella-shaped seal is positioned so that the port can be closed when the handle is prevented from movement by the stopping surface.

By placing the biasing member within the cylinder and having the piston assembly surface face the second end of the biasing member, the cylinder opening seal is mechanically forced against the cylinder interior surface when the piston assembly is in a non-actuated position or when the piston assembly is in an actuated position. This structure is more effective in preventing seepage at the cylinder opening end of the metering chamber. Further, a slidable member can be disposed between the biasing member and the seal to add the functions of closing a port and for dispensing predetermined amounts of liquid.

An additional advantage is providing mechanically activated hinging members to close a port and forming a plurality of these hinging members into an umbrella-shaped seal so that when a slidable member is rotated to adjust the amount of liquid to be dispensed, the umbrella-shaped seal effectively provides a hinging member in position to close a port.

The various advantages and features of novelty which characterize the invention are pointed out with particularity in the claims annexed hereto in forming a part hereof. However, for a better understanding of the invention, its advantages, and objects obtained by its use, reference should be had to the drawings which form a further part hereof, and to the accompanying descriptive matter, in which there is illustrated and described preferred embodiments of the invention.

DETAILED DESCRIPTION OF THE PREFERRED EMBODIMENTS

Figure 1:
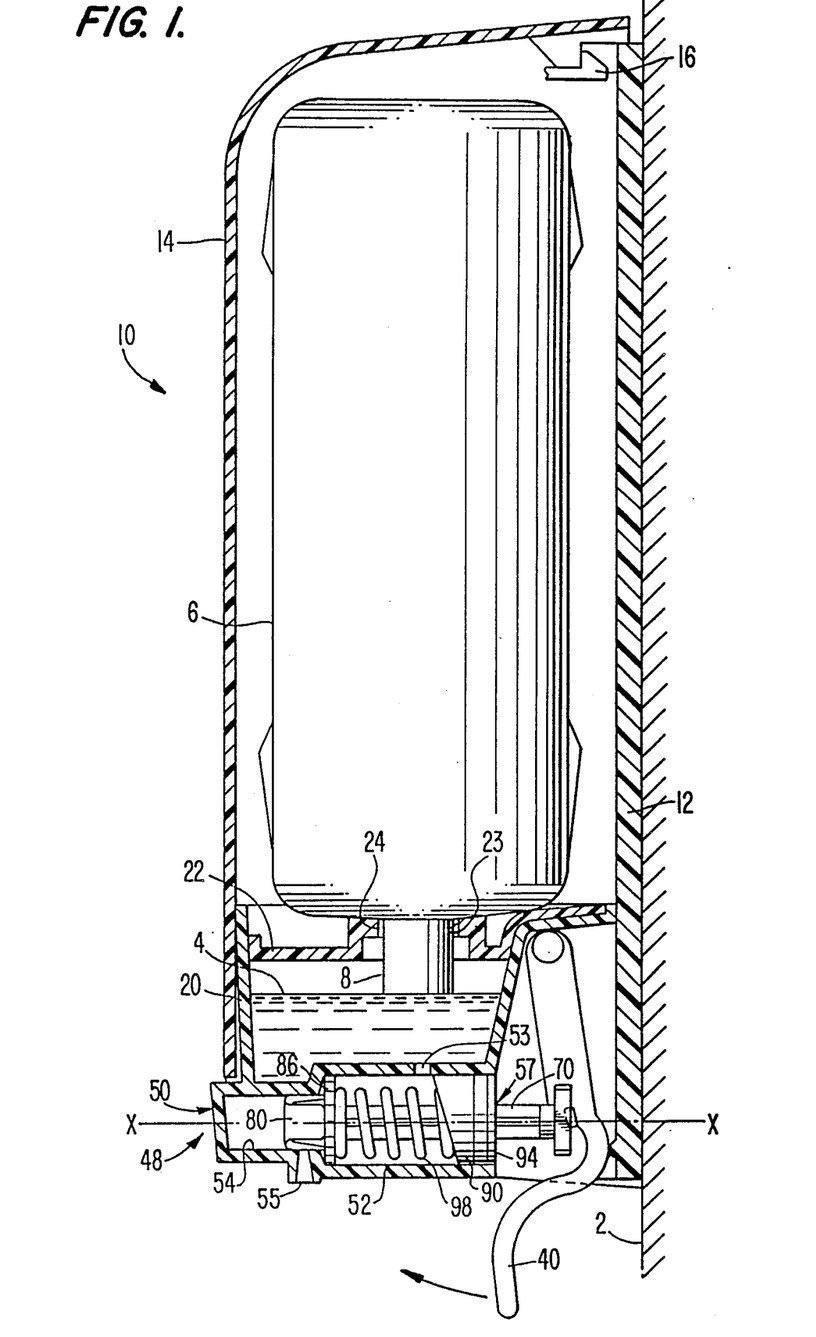
FIG. 1 is a sectional side view of a dispenser of the present invention in a non-actuated position including a metering chamber.

FIG. 1 illustrates the metering chamber of the present invention in a liquid dispenser 10. This liquid dispenser 10 has a backplate 12 which is mounted to a wall 2 and a cover 14 which is pivotably mounted to the backplate 12. The backplate has a latching means 16 to hold the cover 14 in a closed position on the backplate. The dispenser 10 also includes a tank 20 to be used as a supply source for dispensing. The tank 20 includes a corresponding snap-on end cap 22 which has an orifice 24 for the purpose of allowing a neck 8 of a bottle 6 to fit through and rest on a shoulder 23 of the end cap 22. The supporting backplate 12 may conveniently be attached to a supporting wall by threaded fasteners or other suitable means (not shown).

A metering chamber or pump 48 is disposed below the tank 20. A metering chamber 48 includes a cylinder 50 with a central axis along the line X—X. A preferred cylinder has interior surface sections 52 and 54 of two different diameters about X—X. A larger interior surface diameter section 52 of the cylinder includes an inlet port 53 or ports for receiving or throttling liquid from the tank 20. A smaller interior surface diameter section 54 of the cylinder includes an outlet port 55 or ports for dispensing a liquid material. A stopping step 60 on the cylinder 50 defines the difference in diameters between housing sections 52 and 54. In addition, the backplate 12, the cover 14 and the cylinder 50 may preferably be made of a suitable substantially rigid synthetic resin.

The cylinder 50 also includes an opening 57. Through the opening 57 a piston assembly 70 is able to be partially received.

As illustrated in the perspective views of FIGS. 2 and 3, the piston assembly 70 includes a rod 72 having a central axis along X—X. By comparing the non-actuated position of the piston assembly in FIG. 4 with the actuated position of the same piston assembly in FIG. 5, it can be appreciated that the piston assembly moves in a reciprocating motion both partially within the cylinder and partially exterior of the cylinder. Consequently, the piston assembly reciprocates or slides with its axis X—X approximately along the same central axis X—X of the cylinder. This reciprocating or sliding movement of the piston assembly approximately along this same axis is to be distinguished from the rotation of the piston assembly to be described herein.

Figure 4:
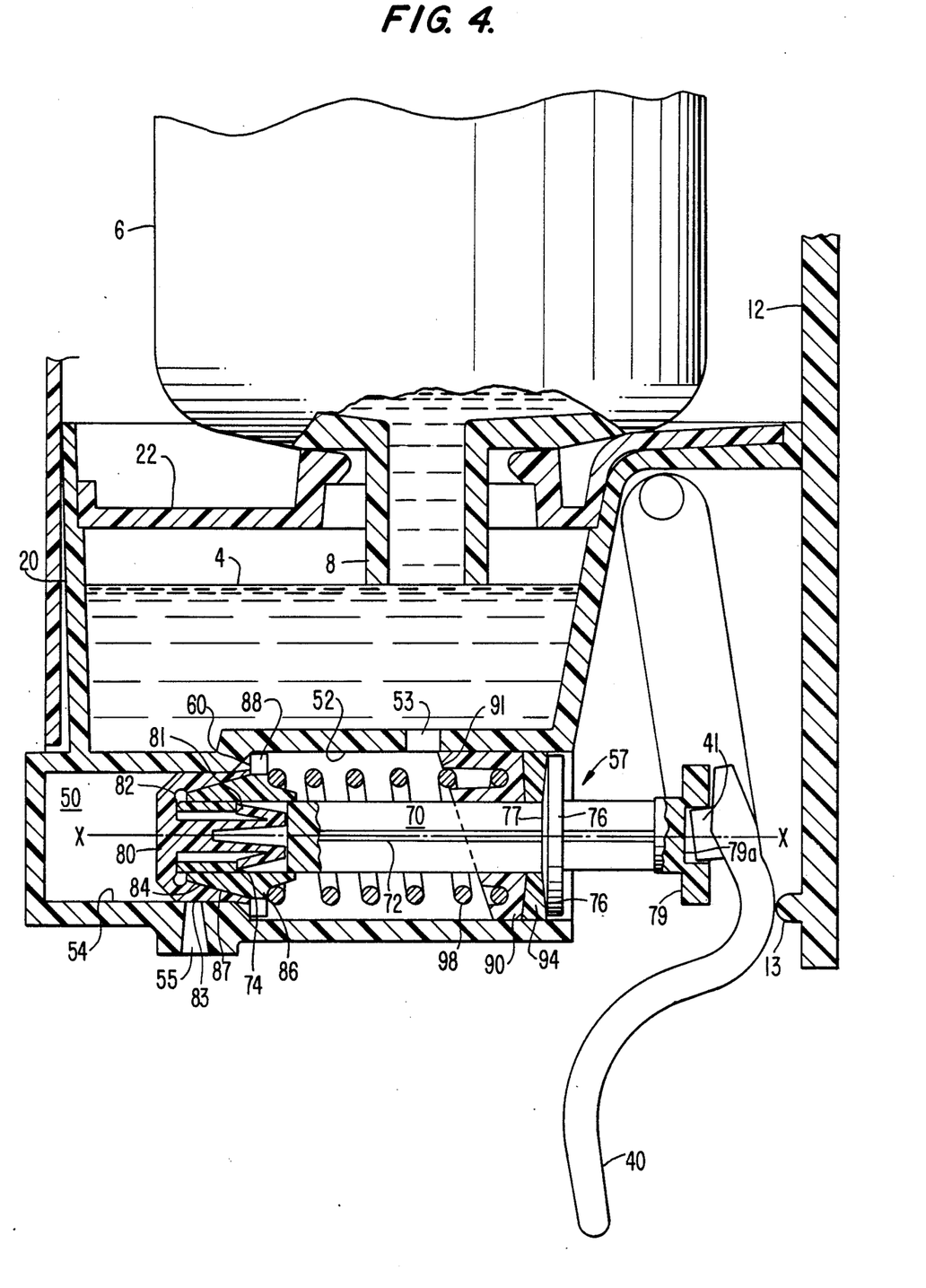
FIG. 4 is an enlarged sectional side view of the dispenser of FIG. 1 illustrating the improved metering chamber structure in a non-actuated position.
Figure 5:
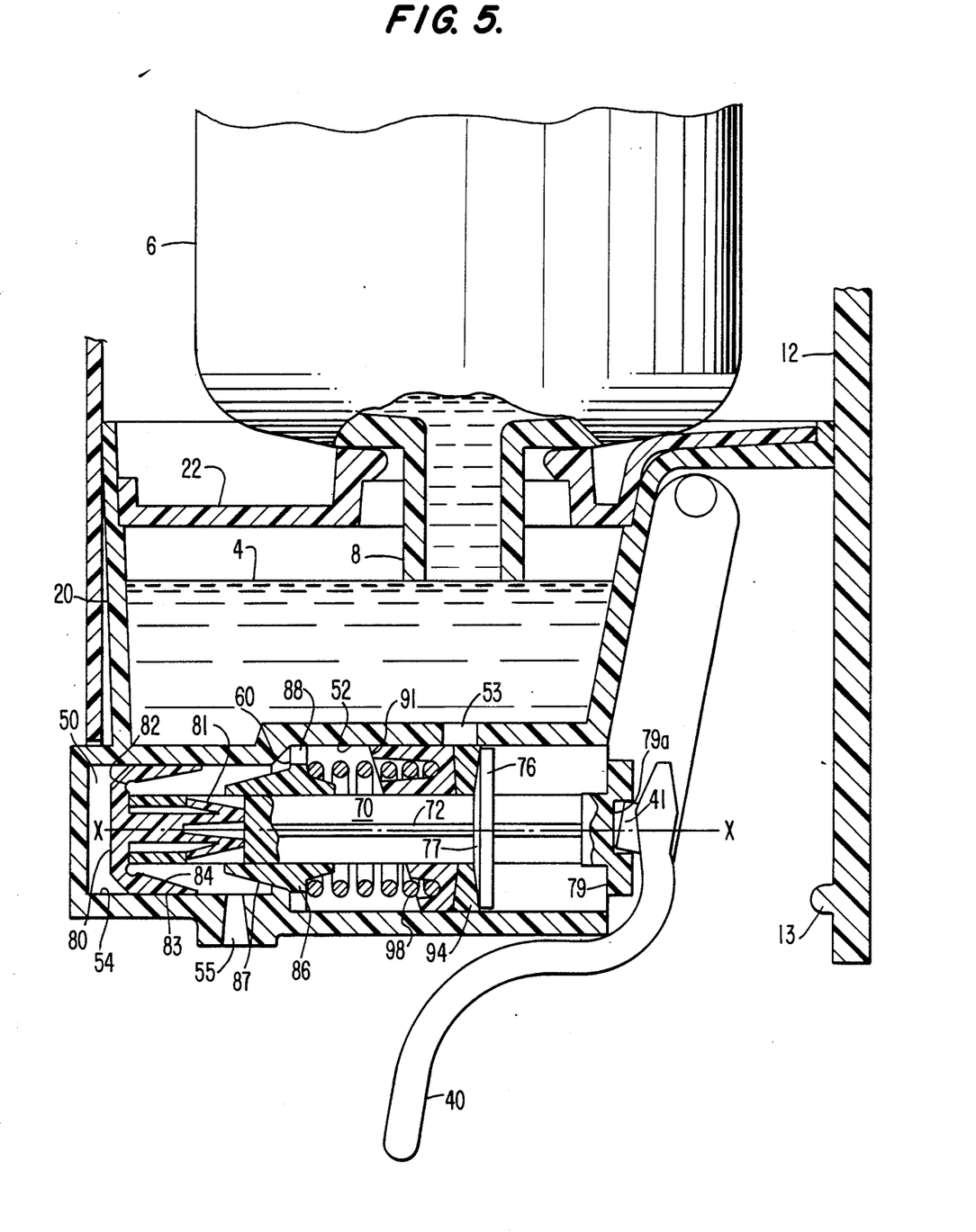
FIG. 5 is an enlarged sectional side view of the metering chamber structure of FIG. 1 in an actuated position.
Figure 6:
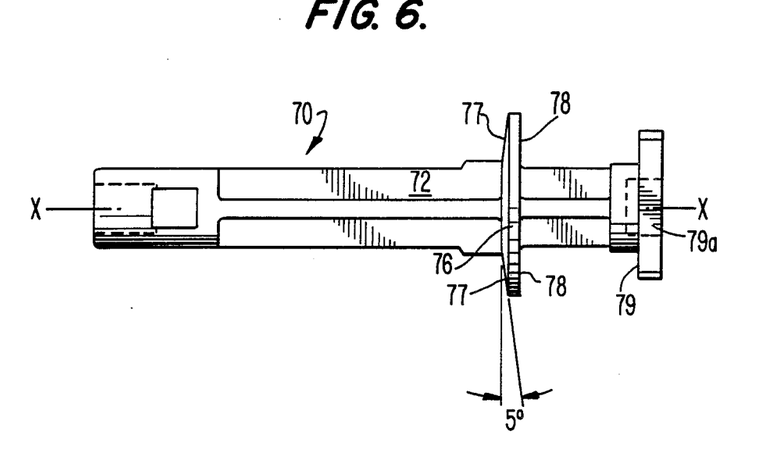
FIG. 6 illustrates a side view of a piston assembly of FIGS. 1-5.

Illustrated in FIG. 6 is the piston assembly taken singularly. A piston rod 72 shown with a partial X-shape in FIG. 6 can also be primarily cylindrical or otherwise modified so long as it performs the functions described herein. On a second end of the piston rod 72 is a piston indexing head 79. The piston indexing head 79 or an equivalent is provided for receiving an actuating force which moves the piston assembly in a direction towards the interior of the cylinder or further within the cylinder. The piston indexing head 79 is disposed exteriorly of the cylinder so that a handle or the like 40, for selectively actuating movement to the piston assembly, can engage the piston indexing head 79 as seen in FIGS. 1, 4 and 5.

The piston indexing head 79 has a square socket 79a which receives a square boss 41 on a handle 40 so that the piston may be maintained in any one of four positions of rotation. The handle 40 is separately pivoted on the dispenser or the cylinder so that the boss 41 can be moved out of the socket 79a to effectuate piston rotation. Consequently, the piston can rotate and be indexed into, preferably, any one of four positions and the handle will still function with the piston indexing head.

A flange 76 on the rod 72 includes a surface 77 which is angled in a range of approximately 5°–10°, and preferably closer to 5°–7°, from a line perpendicular to the piston assembly central axis X—X. The flange also includes an opposite surface 78 which is preferably perpendicular to the piston central axis X—X.

As illustrated in FIGS. 2–5, an umbrella-shaped seal 80 is disposed on a first end of the rod 72. The umbrella-shaped seal 80 includes a plurality of hinge members 82, preferably resilient, with spaces or vents between themselves. The hinging members, in this embodiment, are for outwardly adjusting the umbrella-shaped seal 80 to substantially close the outlet port 55. The umbrella-shaped seal also includes locking tabs 81 for engaging a shoulder 74 of the piston rod 72. An alternative umbrella seal to piston assembly engagements could be used such as having a threaded portion of the umbrella-shaped seal engage a mating threaded end of the piston assembly.

In addition, the umbrella-shaped seal 80 hinging members are located so that at each one of the plurality of predetermined positions of rotation with which the handle boss receiving piston assembly socket can selectively maintain the piston assembly rod, a hinging member is positioned to substantially close the outlet port when the piston assembly is prevented from movement. When the socket and boss are made square for maintaining the rod in any one of four positions of rotation, four hinging members on the umbrella-shaped seal are preferred.

Figure 7:
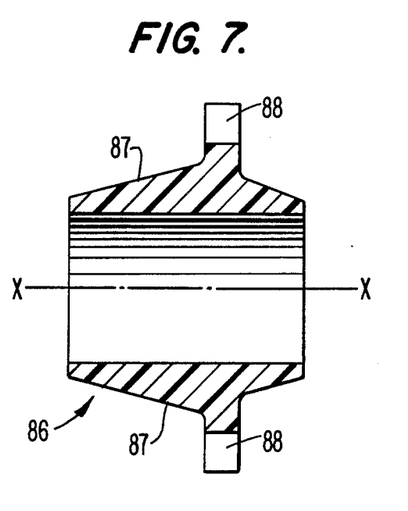
FIG. 7 illustrates a sectional side view of a tapered ring of FIGS. 1-5.

A tapered ring 86 is disposed around the piston rod central axis X—X in a slidable relationship with the piston rod 72. A sectional side view of this tapered ring 86, taken singularly, is shown in FIG. 7. As illustrated in FIGS. 4 and 5, this tapered ring 86 abuts the stopping step 60 of the cylinder 50 so that this tapered sealing ring 86 cannot move forward even as the piston rod 72 slides forward from the non-actuated position in FIG. 4 to the actuated position in FIG. 5. This tapered ring includes a tapered surface 87 and a flange 88 with recesses 89. The recesses 89 allow liquid material to move from the larger interior surface diameter section 52 of the cylinder 50 to the outlet port 55 on the smaller interior surface diameter section 54 of the cylinder.

Also disposed about the piston rod central axis X—X, in a slidable relationship with the piston rod 72, are a slidable variable delivery member 90 and a sealing ring, O-ring or seal 94. The sealing ring 94 is disposed in a face-to-face relationship between the slidable delivery member 90 and the surface 77 of piston assembly flange 76. Both the slidable member 90 and the sealing ring 94 can be slid in a forward direction with the piston rod by the surface 77 of the piston rod flange 76.

A biasing member 98 such as a compression spring or a resilient rubber-like element is disposed between the slidable member 90 and the tapered ring 86. The slidable variable delivery member 90 and the sealing ring 94 can then be slid in a rearward direction with the rod and the handle by the force generated by the biasing member 98.

More specifically, the biasing member 98 is disposed within the cylinder 50 on an opposite side of the sealing ring 94 than the side of the sealing ring which is in a face-to-face relationship with the surface 77 of the flange 76 of the piston assembly 70. This biasing member 98, preferably a spring, has one end or surface 99, disposed in a substantially fixed position relative to the cylinder. As seen in FIGS. 4 and 5, the preferred fixed position of the biasing member is against the tapered ring 86 which is in a stationary position against the stopping step 60 of the cylinder 50. With one end 99 being in a substantially fixed position relative to the cylinder, an opposite second end or surface 100 of the biasing member, which is closer to the cylinder opening 57 than the first end of the biasing member, can exert a biasing force against the sealing ring 94 either directly or, as shown, via the slidable member 90. Both the biasing member and, if used, the slidable member should preferably be more rigid than the sealing ring 94 to obtain compression of the sealing ring. When the umbrella-shaped seal is used, the piston assembly rod extends through this biasing member and a first end of this piston rod is further from the cylinder opening than the biasing member first end 99.

To substantially fix the first end 99 of the biasing member relative to the cylinder, several alternative structures can be used. For example, instead of having the first end 99 disposed against a stationary tapered ring 86, one could have the first end 99 of the biasing member disposed against protrusions from the cylinder 50, disposed against the interior surface of the cylinder, welded to the cylinder or disposed directly against the stopping step 60 defining two different interior surface diameters of a cylinder.

The surface 77 of the piston assembly 70 should, preferably, face the expanding second end or surface 100 of the biasing member 98. In other words, the piston assembly 77 should be in a linear relationship with the second end or surface 100 of the biasing member to oppose the expanding forces generated by the second end of the biasing member. Having the biasing member centered about the same piston assembly central axis X—X helps accomplish this design criteria.

It is also preferable that the surface portion 77 of the flange 76 of the piston assembly 70 have a greater rigidity than the sealing ring 94 so that when the surface 77 acts upon the seal, which is undergoing an opposing force generated by the biasing member, it is the seal which compresses and is forced outwards to continuously engage a circumferential segment of the interior surface of the cylinder.

Figure 8:
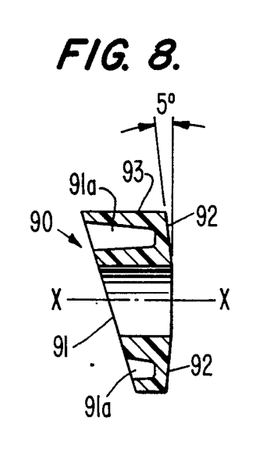
FIG. 8 illustrates a sectional side view of a slidable variable delivery member of FIGS. 1-5.

The slidable variable delivery member 90, illustrated singularly in FIG. 8 or as disposed on the piston rod in FIGS. 1–5, has a first surface 91 on which the biasing member second end 100 is disposed along. This does not necessarily mean the biasing member is abutting the first surface of the slidable member. For example, as shown in FIG. 8, a slidable member first surface can further comprise at least one recess 91a within which the biasing member second end 100 can extend and be disposed within. Adding a recess is a preferred structure for assuring that a spring biasing member generated force is primarily directed against the sealing ring 94.

The first major function of the slidable member 90 is to apply a biasing member generated force to the sealing ring 94. The slidable member has a second surface 92 which is closer to the cylinder opening than the slidable member first surface 91. This second surface 92 is normally disposed in a face-to-face relationship with the sealing ring 94 to exert a biasing member generated compressive force on the seal when the piston assembly is disposed in a stopped, non-actuated position and to exert an opposing biasing member generated reactionary force on the seal when the piston assembly flange surface 77 is moved in response to an actuating force which is sufficient to overcome an opposing biasing member force.

As seen in FIG. 8, the preferred second surface 92 of the slidable member is angled from a line extending perpendicular to the piston assembly central axis X—X. This angle is in a range of approximately 5–10% and preferably closer to 5–7%. This slightly outwardly extending angle on the slidable member second surface 92 will enable the slidable member to exert an outward or cylinder interior surface directed force component on the seal when placing the seal under the above-mentioned compressive forces. Thus, the seal will be even more tightly compressed against a circumferential segment of the interior surface of the cylinder.

A second major function of the slidable member 90 is to cover an interior surface port. The slidable member shown has a section or surface 93 for substantially closing the inlet port 53 when the slidable member is moved to a predetermined position. Although this added function is not necessary to obtain a seal at the opening 57 of the cylinder, having a section which substantially closes a port adds a second sealing capability to the metering chamber 48.

The slidable member 90 can also perform a third major function of varying the maximum amount of liquid which can be dispensed. During the initial part of the stroke, while a portion of the inlet port 53 remains open and uncovered, the compressed liquid may flow in a reverse direction from cylinder 50, through inlet port 53 and back into tank 20, thus causing no substantial amount of liquid to be forced out of the outlet port 55 during this portion of the piston assembly advance. Consequently, as long as a portion of inlet port 53 is open and not covered by the advance of slidable member 90, no substantial amount of liquid will be dispensed. Effectively, the dispensing result is the same as if the stoke length of the reciprocating piston assembly 70 were reduced by an amount equal to the portion of the stroke wherein inlet port 53 remains open.

At the point in the piston assembly advance where the liquid contacting face 91 of the slidable member 90 has moved past the inlet port 53, thus completely closing the inlet port with slidable member surface 93, no path for any such reverse flow of liquid is then open. Accordingly, from this point of the piston advance onward, the only outlet for the compressed liquid is through the outlet port 55, and further advance of the piston assembly 70 will thus result in liquid being so dispensed.

To prevent any liquid from being dispensed out of the outlet port 55 when the inlet port is still open, it is preferred, however, to have the hinging member first surface of sufficient length to keep the outlet port closed until the inlet port is closed off. In this preferred mode, the maximum amount available to dispense is accurately controlled.

To adjust the maximum amount of liquid to be dispensed, the first surface or liquid contacting face 91 of the slidable delivery member 90 is angled to not be perpendicular with respect to the piston central axis X—X. The non-perpendicular angle relationship of this slidable member face 91 to the piston central axis X—X is illustrated in the side views of the piston assembly of FIGS. 4 and 5. With the slidable member 91 angled, the port closing surface 93 of the slidable member is of varying width. By rotating the piston rod and the angled slidable member together about the axis X—X, the point on the stroke length where the inlet port is closed by the surface 93 is varied. In other words, the rotated position of the angled slidable member helps determine the point on the stroke of the piston at which the liquid will stop being forced back through the inlet port 53 and the point where the amount of liquid in the cylinder is trapped. Thus, the angled slidable member first surface or liquid contacting face 91 rotating with the piston rod 72 acts as a means for varying the maximum amount of liquid which can be dispensed.

The slidable member 90 can be keyed to or otherwise mounted on the piston assembly so that when the piston assembly is rotated, the slidable member rotates with the piston assembly while still being able to slide relative to the piston assembly rod 72.

Further details on this variable delivery function of the slidable member are disclosed in U.S. Pat. No. 4,036,406 to Jespersen and DeLuca. The disclosure of this patent no. 4,036,406, issued July 19, 1977, is hereby incorporated by reference.

The sealing ring 94 is preferably made of a soft inert material. Although one seal is preferred, two or more seals can be used to perform the same function. It is important this seal is disposed between the biasing member second end 100 and the piston assembly surface portion 77. The seal can be continuously disposed against a circumferential segment of the chamber interior surface, because it is continuously under compressive forces from both of the piston assembly flange surface and the biasing member second end or surface. Also the seal is preferably positively forced into a relatively tighter position against a circumferential segment of the cylinder interior surface when the piston assembly is moved in response to an actuating force which is sufficient to overcome the opposing biasing member force than when said piston assembly is prevented from movement by the stopping means.

Preferably, the seal has a substantially circular shape and the cylinder interior surface has a substantially similar circular shape to facilitate disposing the seal continuously against a circumferential segment of the interior surface of the cylinder. It is recognized, however, the cylinder and the seal can be of various shapes such as elliptical so long as the cylinder and seal perform the functions described herein.

As mentioned, the second surface of the slidable member is disposed approximately in a range of about 5°–10° and preferably closer to 5°–7° from a plane extending perpendicular from the central axis X—X of the piston assembly. See, FIG. 8. Also, as mentioned, the piston assembly first surface 77 is disposed approximately in a range of 5°–10° and preferably closer to 5°–7° from a plane extending perpendicular to the central axis X—X of the piston assembly. See, FIG. 6. Having both of these sealing ring contacting surfaces angularly displaced a preferred amount of about 5°–7° a line extending perpendicular to the piston assembly central axis, i.e. a combined total of approximately 10°–° from each other, will force the seal to be even more tightly forced against the cylinder interior surface to further prevent seepage at the opening 57 of the cylinder.

When the device is in the non-actuated position, a means for stopping reciprocating or sliding movement of the piston assembly should be provided as the piston assembly indexing head moves a predetermined distance in a direction away from the cylinder opening. By defining a stopping position of the piston assembly during the static state, the surface 77 of the piston assembly flange 76 can then exert a compressive force on the seal to oppose the biasing member generated force on the seal. One structure for stopping the movement of the piston assembly when the piston assembly indexing head is moving away from the cylinder opening is to have the handle 40, disposed in piston indexing head 79, come in contact directly with the backplate 12 or, as in FIG. 4, contact a protrusion 13 on the backplate 12. Alternatively, one can provide projections on the cylinder to contact a second surface 78 of piston assembly flange 76 to stop rearward movement of the piston assembly. The projections on the cylinder, therefore, could also serve the function of defining the piston assembly receiving opening 57. With the biasing member transmitting energy, through the slidable member and the sealing ring, against the piston assembly flange 77, the piston is held firmly in its non-actuated position.

The tapered ring 86, in addition to preferably providing an area for the biasing member to be disposed in a fixed position relative to the cylinder, serves at least a second function. The tapered ring also serves the function of pushing a second surface 84 of the hinging member 82 of an umbrella-shaped seal 80 outwardly when a hinging member 82 is moved with the piston assembly against the tapered surface 87 of the tapered ring. Due to the pushing force of the tapered ring surface 87 on the hinging member second surface 84, a first surface 83 of the umbrella-shaped seal hinging member 82 can then be forced against the cylinder interior surface to substantially close a cylinder port. Although the sealing ring of FIGS. 1–5 and 7 has a tapered surface 87 and the hinging member 82 has at least one tapered surface 84, which tapers in an opposite direction, one does not have to have two oppositely tapered surfaces. One element could have a protrusion or the like so long as the contact is made between these surfaces to enable the first surface 83 of the hinging member 82 to substantially close a port. Further, pushing against one surface 84 of the hinging member 82 so that the opposing surface 83 of the hinging member can close off a port does not have to be done by a separate element such as a tapered ring 86. Alternatively, the cylinder could have an integral protrusion preferably shaped with a tapered surface like the tapered ring surface 87 to contact the hinging second surface 84 to obtain the same port closing result. Also, member hinging members can be used to substantially close off both an inlet and an outlet port if desired.

In addition, the hinging member also does not have to be part of an umbrella-shaped seal ring but could be a hook-like member connected to the piston assembly rod or integral with the piston assembly rod to engage the tapered ring 86 or an equivalent and close off a port. In order, however, for at least one of the hinging members 82 to be pushed outwardly by the tapered sealing ring 86 when the piston assembly rod 72 is rotated, an umbrella-shaped seal 80 having a plurality of hinging members 82, all of which have a surface which can substantially cover the port and all of which have opposing oppositely tapered surfaces, is preferred. As discussed earlier, the umbrella-shaped seal hinging members are preferably positioned to be able to close the port at each one of the plurality of predetermined positions of the rod and the slidable member rotation. Consequently, this umbrella-shaped seal, therefore, is especially applicable when one combines it with the variable delivery function of the angled slidable member, because the rod will be rotated to adjust the maximum liquid to dispense and the umbrella-shaped seal will still be able to close the outlet port during the non-actuated position.

If one incorporated the improved handle end seal only, or the handle end seal and the slidable member serving to compressibly seal the handle end opening of the cylinder and to close off one port, one could close off any additional desired ports with a conventional nozzle (not shown). An example of a conventional nozzle is disclosed in U.S. Pat. No. 4,036,406 to Jespersen and DeLuca, the disclosure of which has been incorporated by reference.

If one decided to use these nozzles of the U.S. Pat. No. 4,036,406 or some other means for controlling input or output through the cylinder 50, the purpose of the piston assembly would be limited to providing a compressive force from the piston flange surface 77 to the sealing ring 94. Thus, the piston assembly 70 would not have to extend past or into the cylinder beyond the surface 77 of flange 76. The slidable member 90 and the sealing ring 94 could then be disposed across a circumferential segment of the cylinder and not disposed around a piston assembly rod 72. In such a handle end sealing structure, the piston assembly would not have to be received initially within the cylinder but would at least have to have the surface 77 lie in the plane defining the cylinder opening 57 so that the sealing ring 94 is disposed within the cylinder to seal the opening of the cylinder.

When the piston is at rest in its non-actuated position as in FIG. 4, the liquid contacting face 92 of the slidable member 90 exposes a portion of the inlet port 53, thereby permitting liquid 4 from the tank 20 to flow into and, thus, fill the portion of the cylinder 50 ahead of the seal 94. In this non-actuated state, a hinging member 82 of the umbrella-shaped seal 80 has moved with the piston assembly rod 72 towards the tapering ring 86. Upon this movement, a surface 84 of one of the hinging members 82 of the umbrella-shaped valve seal 80 will engage an oppositely tapered surface 87 of the stationary tapered ring 86 to be pushed outwardly so that a hinging member surface 83 will substantially close the outlet port 55. Having the stationary tapered ring 86 push an umbrella-shaped seal hinging member 82 provides a tight seal to prevent seepage through the outlet port as well as obtaining a tight cylinder opening seal from the compressive forces acting on the sealing ring 94.

When the dispenser handle 40 is actuated, piston-indexing head 79 and, thus, piston assembly rod 72 are urged from the non-actuated position to the actuated position as in FIG. 5. The slidable member 90 then closes off the inlet port 53. Upon closing of the inlet port 53, the liquid is under pressure to move away from the piston receiving opening end of the cylinder. Simultaneously, the umbrella-shaped seal 80 is moving forward with the piston assembly rod 72 and away from the outward pushing force of the tapered ring 86. The first surface 83 of an umbrella-shaped seal hinging member 82 is moved away from the outlet port to open up the outlet port. With a further stroke by the operator, the liquid, being under pressure, is then forced through the recesses 89 in the tapered ring flange 88 to be dispensed out the outlet port.

While the invention has been described in connection with what is presently considered to be the most practical and preferred embodiment, it is to be understood that the invention is not to be limited to the disclosed embodiment, but on the contrary, it is intended to cover various modifications and equivalent arrangements included within the sphere and scope of the appended claims.

What is claimed is:

1. An apparatus for dispensing liquids, pastes, creams or pellets comprising:
  a cylinder including an interior surface defining a circumference of the cylinder and having an opening at one end of the cylinder and at least one port on the interior surface of the cylinder;
  at least one biasing member, disposed within the cylinder, including:
    a first end in a substantially fixed position relative to the cylinder; and
    an opposite second end being closer to the cylinder opening than the biasing member first end is to the cylinder opening;
  a piston assembly, disposed for being partially received in the cylinder through the cylinder opening, including:
    a rod extending through the biasing member and having a first end which is further from the cylinder opening than the biasing member first end and having a second end disposed exteriorly of the cylinder;
    a flange extending from the rod and having a surface facing the second end of the biasing member;
    means, mounted on the piston rod near the second end of the rod, for receiving an actuating force to move the piston assembly flange surface in a direction towards the fixed position first end of the biasing member;
  at least one hinging member, mounted on the first end of the piston assembly rod, including first and second opposing surfaces;
  means, disposed within the cylinder in a substantially fixed position relative to the cylinder, for pushing the hinging member second surface in a direction approximately towards the port when the hinging member is moved with the piston assembly rod so that the hinging member first surface can be forced against the cylinder interior surface to substantially close the port;
  means for stopping movement of the piston assembly when the piston assembly actuating force receiving means moves a predetermined distance away from the cylinder opening; and
  a seal, disposed within the cylinder, on the piston assembly rod and between the piston assembly flange surface and the biasing member second end, which continuously engages a circumferential segment of the cylinder interior surface when the piston assembly is prevented from movement by the stopping means, the biasing member second end is exerting a force on the seal and the stopped piston assembly flange surface is exerting an opposing force on the seal, and which continuously engages a circumferential segment of the cylinder interior surface when the piston assembly rod is moved in response to an actuating force which is sufficient to overcome an opposing biasing member force, the moved piston assembly flange surface is exerting a force on the seal and the biasing member second end is exerting an opposing force on the seal.

2. An apparatus for dispensing liquids, pastes, creams or pellets comprising:
  a cylinder including an interior surface defining a circumference of the cylinder and having an opening at one end of the cylinder and at least one port on the interior surface of the cylinder;
  a biasing member, disposed within the cylinder, including:
    a first end in a substantially fixed position relative to the cylinder; and
    an opposite second end closer to the cylinder opening than the biasing member first end is to the cylinder opening;
  a piston assembly, partially received in the cylinder through the cylinder opening, including:
    a rod extending through the biasing member and having a first end which is further from the cylinder opening than the biasing member first end and having a second end disposed exteriorly of the cylinder;
    a flange extending from the rod and having a surface facing the second end of the biasing member;
    means, mounted on the piston rod near the second end of the rod, for receiving an actuating force to move the piston assembly flange surface in a direction towards the fixed position first end of the biasing member;

at least one hinging member, mounted on the first end of the piston assembly rod, including first and second opposing surfaces;

means disposed within the cylinder in a substantially fixed position relative to the cylinder, for pushing the hinging member second surface in a direction approximately towards the port when the hinging member is moved with the piston assembly rod;

means for stopping movement of the piston assembly when the piston assembly actuating force receiving means moves a predetermined distance away from the cylinder opening; and a seal, disposed on the piston assembly rod between the piston assembly flange surface and the biasing member second end, which continuously engages a circumferential segment of the cylinder interior surface.

3. An apparatus as in claim 2, further comprising a slidable member disposed on the piston assembly rod including:

a first surface on which the biasing member second end is disposed along; and an opposite second surface disposed in a face-to-face relationship with the seal between the seal and the biasing member so that the slidable member second surface exerts the biasing member generated forces on the seal.

4. An apparatus as in claim 3, further comprising means, pivotally mounted on the apparatus and exteriorly of the cylinder, for selectively actuating movement to the piston assembly including:

means for releasably engaging the piston assembly actuating force receiving means; and means for contacting the stopping means when the movement actuating means is moved a predetermined distance in a direction away from the cylinder opening, and wherein the piston assembly actuating force receiving means further comprises means for engaging the movement actuating means to selectively maintain the piston assembly rod in one of a plurality of predetermined positions of rotation.

5. An apparatus as in claim 4, wherein:

the cylinder and the piston assembly rod each have a central axis which are the same axis and the rod can rotate about this central axis;

the slidable member rotates with the piston assembly rod; and the slidable member first surface is at a non-perpendicular angle to the piston assembly rod central axis.

6. An apparatus as in claim 5, wherein the at least one hinging member further comprises a plurality of hinging members which together define an umbrella-shaped seal mounted on the first end of the piston assembly rod and each of the hinging members includes a first surface and a second opposing surface, and at each one of the plurality of predetermined positions of rotation with the piston assembly actuating force receiving means can selectively maintain the piston assembly rod, a hinging member of the umbrella-shaped seal is positioned so that the first surface of a hinging member substantially closes the port when the contacting means of the movement actuating means is prevented from movement by the stopping means.

7. An apparatus as in claim 6, wherein the cylinder port is an outlet port and the cylinder also has an inlet port; and the slidable member further comprises an outer circumferential surface for closing the inlet port, wherein the width of the outer surface varies and the position of the piston assembly at which the inlet port will be closed is dependent upon the rotational position of the slidable member and the piston assembly rod.

8. An apparatus as in claim 4, wherein the movement actuating means further comprises a handle pivotally mounted on the apparatus and the piston assembly engaging means of the movement actuating means is a square boss on the handle; and the piston assembly actuating force receiving means further comprises a square socket engaging said handle square boss so that the piston may be maintained in any one of four positions of rotation.

9. An apparatus as in claim 3, wherein the cylinder port is an outlet port and the cylinder also has an inlet port; and the slidable member further comprises an outer circumferential surface for closing the inlet port, wherein the width of the outer surface varies and the position of the piston assembly at which the inlet port will be closed is dependent upon the rotational position of the slidable member and the piston assembly rod.

10. An apparatus as in claim 2, wherein the at least one hinging member further comprises a plurality of hinging members which together define an umbrella-shaped seal mounted on the first end of the piston assembly rod and each of the hinging members includes a first surface and a second opposing surface.

11. An apparatus as in claim 2, wherein the biasing member first end is disposed against the hinging member pushing means.

12. An apparatus for dispensing liquids, pastes, creams or pellets comprising:

a cylinder including an interior surface defining a circumference of the cylinder and having an opening at one end of the cylinder and an outlet port;

a biasing member, disposed within the cylinder, including:

a first end in a substantially fixed position relative to the cylinder; and an opposite second end closer to the cylinder opening than the biasing member first end is to the cylinder opening;

a piston assembly partially received in the cylinder through the cylinder opening, including:

a surface facing the second end of the biasing member;

means, disposed exterior of the cylinder, for receiving an actuating force to move the piston assembly surface in a direction towards the fixed position first end of the biasing member;

a rod extending through the biasing member and having a first end which is further from the cylinder opening than the biasing member first end;

means for stopping movement of the piston assembly when the piston assembly actuating force receiving means moves a predetermined distance away from the cylinder opening; and a seal, disposed between the piston assembly surface and the biasing member second end, which continuously engages a circumferential segment of the cylinder interior surface; and a hinging member, disposed on the first end of the piston assembly rod, for substantially closing the outlet port when the piston assembly is prevented from movement by the stopping means.

13. An apparatus as in claim 12, wherein the seal is continuously forced into a relatively tighter position against a circumferential segment of the cylinder interior surface when the piston assembly is moved in response to an actuating force which is sufficient to overcome the opposing biasing member force than when the piston assembly is prevented from movement by the stopping means.

14. An apparatus as in claim 12, further comprising means, pivotally mounted on the apparatus and exteriorly of the cylinder, for selectively actuating movement to the piston assembly including:

means for releasably engaging the piston assembly actuating force receiving means; and means for contacting the stopping means when the movement actuating means is moved a predetermined distance in a direction away from the cylinder opening.

15. An apparatus as in claim 12, wherein the biasing member is a spring.

16. An apparatus as in claim 12. wherein:

said piston assembly rod further comprises a second end disposed exteriorly of the cylinder;

said piston assembly further comprises a flange extending from the rod on which the piston assembly surface is disposed; and said apparatus further comprises means, disposed on the piston assembly rod, for substantially closing the inlet port when the piston assembly is moved a predetermined distance in response to an actuating force sufficient to overcome an opposing biasing member force.

17. An apparatus for dispensing liquids, pastes, creams or pellets comprising:

a cylinder including an interior surface defining a circumference of the cylinder and having an opening at one end of the cylinder, an inlet port and an outlet port;

at least one biasing member, disposed within the cylinder, including:
    a first end in a substantially fixed position relative to the cylinder; and
    an opposite second end being closer to the cylinder opening than the biasing member first end is to the cylinder opening;

a piston assembly, disposed for being partially received in the cylinder through the cylinder opening, including:
    a surface facing the second end of the biasing member;
    means, disposed exterior of the cylinder, for receiving an actuating force to move the piston assembly surface in a direction towards the fixed position first end of the biasing member;
    a rod extending through the biasing member and having a first end which is further from the cylinder opening than the biasing member first end and having a second end disposed exteriorly of the cylinder; and
    a flange, extending from the rod on which the piston assembly surface is disposed;

means for stopping movement of the piston assembly when the piston assembly actuating force receiving means moves a predetermined distance away from the cylinder opening;

a seal, disposed within the cylinder and between the piston assembly surface and the biasing member second end, which continuously engages a circumferential segment of the cylinder interior surface when the piston assembly is prevented from movement by the stopping means, the biasing member second end is exerting a force on the seal and the stopped piston assembly surface is exerting an opposing force on the seal, and which continuously engages a circumferential segment of the cylinder interior surface which is sufficient to overcome an opposing biasing member force, the moved piston assembly surface is exerting a force on the seal and the biasing member second end is exerting an opposing force on the seal;

at least one hinging member, disposed on the first end of the piston assembly rod, for substantially closing the outlet port when the piston assembly is prevented from movement by the stopping means; and means, disposed on the piston assembly rod, for substantially closing the inlet port when the piston assembly is moved a predetermined distance in response to an actuating force sufficient to overcome an opposing biasing member force.

18. An apparatus for dispensing liquids, pastes, creams or pellets comprising:

a cylinder including an interior surface defining a circumference of the cylinder and having an opening at one end of the cylinder and at least one port on the interior surface of the cylinder;

at least one biasing member, disposed within the cylinder, including:
    a first end in a substantially fixed position relative to the cylinder; and
    an opposite second end being closer to the cylinder opening than the biasing member first end is to the cylinder opening;

a slidable member including:
    a first surface on which the biasing member second end is disposed along;
    an opposite second surface being closer to the cylinder opening than the slidable member first surface; and
    an outer circumferential surface for substantially closing the cylinder port when the slidable member is moved within the cylinder to a predetermined position;

a piston assembly, disposed for being partially received in the cylinder through the cylinder opening, including:
    a surface facing the second surface of the slidable member; and
    means, disposed exterior of the cylinder, for receiving an actuating force to move the piston assembly surface in a direction towards the fixed position first end of the biasing member;

means for stopping movement of the piston assembly when the piston assembly actuating force receiving means moves a predetermined distance away of the cylinder opening; and a seal, disposed within the cylinder and in a face-to-face relationship between both the piston assembly surface and the slidable member second surface, which continuously engages a circumferential segment of the cylinder interior surface when the piston assembly is prevented from movement by the stopping means, the slidable member second surface is exerting a biasing member generated force on the seal and the stopped piston assembly surface is exerting an opposing force on the seal, and which continuously engages a circumferential segment of the cylinder interior surface when the piston assembly is moved in response to an actuating force which is sufficient to overcome an opposing biasing member force, the moved piston assembly surface is exerting a force on the seal and the slidable member second surface is exerting an opposing biasing member generated force on the seal.

19. An apparatus for dispensing liquids, pastes, creams or pellets comprising:
    a cylinder including an interior surface defining a circumference of the cylinder and having an opening at one end of the cylinder and at least one port on the interior surface of the cylinder;
    a biasing member, disposed within the cylinder, including:
        a first end in a substantially fixed position relative to the cylinder; and
        an opposite second end closer to the cylinder opening than the biasing member first end is to the cylinder opening;
    a slidable member including:
        a first surface on which the biasing member second end is disposed along;
        an opposite second surface closer to the cylinder opening than the slidable member first surface; and
        an outer circumferential surface for substantially closing the cylinder port when the slidable member is moved within the cylinder to a predetermined position;
    a piston assembly, partially received in the cylinder through the cylinder opening, including:
        a surface facing the second surface of the slidable member; and
        means, disposed exterior of the cylinder, for receiving an actuating force to move the piston assembly surface in a direction towards the fixed position first end of the biasing member;
    means for stopping movement of the piston assembly when the piston assembly actuating force receiving means moves a predetermined distance away from the cylinder opening; and
    a seal, disposed within the cylinder and in a face-to-face relationship between both the piston assembly surface and the slidable member second surface, which continuously engages a circumferential segment of the cylinder interior surface.

20. An apparatus as in claim 19, wherein:
    the cylinder port is an inlet port and the cylinder interior surface also has an outlet port;
    the piston assembly further comprises a rod extending through the biasing member and having a first end which is further from the cylinder opening than the biasing member first end and having a second end disposed exteriorly of the cylinder;
    the piston assembly actuating force receiving means is mounted on the piston rod near the second end of the rod; and
    the apparatus further comprises at least one hinging member, mounted on the first end of the piston assembly rod, for substantially closing the outlet port when the piston assembly is prevented from movement by the stopping means.

21. An apparatus in claim 20, wherein:
    the at least one hinging member further comprises a first surface and a second opposing surface; and
    the apparatus further comprises means, disposed in a substantially fixed position relative to the cylinder, for pushing the hinging member second surface approximately towards the outlet port when the hinging member is moved with the piston assembly rod so that the hinging member first surface can be forced against the cylinder outlet port to substantially close the outlet port.

22. An apparatus as in claim 21, wherein:
    the piston assembly rod and the cylinder have a central axis which are the same axis and the rod can rotate about this central axis;
    the slidable member rotates with the piston assembly rod; and
    the slidable member first surface is at a non-perpendicular angle to the piston assembly rod central axis.

23. An apparatus as in claim 21, wherein the at least one hinging member further comprises a plurality of hinging members which together define an umbrella-shaped seal disposed on the piston assembly rod and each hinging member has first and second opposing surfaces.

24. An apparatus as in claim 20, wherein the seal is disposed around the piston assembly rod and is in a slidable relationship with the piston assembly rod.

25. An apparatus as in claim 19, wherein the slidable member further comprises at least one recess on the slidable member first surface within which the biasing member second end extends.

26. An apparatus as in claim 19, wherein the biasing member has a greater rigidity than the seal.

27. An apparatus as in claim 19, wherein the slidable member has a greater rigidity than the seal.

28. An apparatus as in claim 19, wherein the piston assembly and the cylinder have a central axis which are the same axis, the second surface of the slidable member is disposed approximately in a range of 5°-10° from a plane extending perpendicular from the central axis of the piston assembly and the piston assembly slidable member facing surface is disposed approximately in a range of 5°-10° from a plane extending perpendicular from the central axis of the piston assembly.

29. An apparatus as in claim 19, wherein:
    the piston assembly and the cylinder have a central axis which are the same axis and the piston assembly can rotate about the central axis;
    the slidable member rotates with the piston assembly; and
    the slidable member first surface is at a non-perpendicular angle to the piston assembly central axis.

30. An apparatus as in claim 19,
    further comprising means, pivotally mounted on the apparatus and exteriorly of the cylinder, for selectively actuating movement to the piston assembly including:
        means for releasably engaging the piston assembly actuating force receiving means; and
        means for contacting the stopping means when the movement actuating means is moved a predetermined distance in a direction away from the cylinder opening; and wherein the piston assembly actuating force receiving means further comprises means for engaging the movement actuating means to selectively maintain the piston assembly rod in one of a plurality of predetermined positions of rotation.

31. An apparatus for dispensing liquids, pastes, creams or pellets comprising:
    a cylinder including an interior surface having an opening at one end of the cylinder and an inlet port and an outlet port on the interior surface of the cylinder;
    a piston assembly, disposed for being partially received in the cylinder through the cylinder opening, including:
      a rod having a first end disposed within the cylinder and a second end disposed exterior of the cylinder; and
      means, mounted on the piston rod near the second end of the rod, for receiving an actuating force to move the piston assembly further within the cylinder;
      at least one hinging member, mounted on the first end of the piston assembly rod, including first and second opposing surfaces; and
      means, disposed within the cylinder in a substantially fixed position relative to the cylinder, for pushing the hinging member second surface in a direction approximately towards the outlet port when the hinging member is moved with the piston assembly rod so that the hinging member first surface can be forced against the cylinder interior surface to substantially close the outlet port.

32. An apparatus for dispensing liquids, pastes, creams or pellets comprising:
    a cylinder including an interior surface having an opening at one end of the cylinder and an inlet port and an outlet port on the interior surface of the cylinder;
    a piston assembly, partially received in the cylinder through the cylinder opening, including;
      a rod having a first end disposed within the cylinder and a second end disposed exterior of the cylinder; and
      means, mounted on the piston rod near the second end of the rod, for receiving an actuating force to move the piston assembly further within the cylinder;
      at least one hinging member, mounted on the first end of the piston assembly rod, including first and second opposing surfaces; and
      means, disposed within the cylinder in a substantially fixed position relative to the cylinder, for pushing the hinging member second surface in a direction approximately towards the outlet port when the hinging member is moved with the piston assembly rod to substantially close the outlet port.

33. An apparatus as in claim 32, wherein the hinging member second surface is tapered.

34. An apparatus as in claim 33, wherein the pushing means further comprises a hinging member contacting surface which is oppositely tapered from the tapered hinging member second surface.

35. An apparatus as in claim 32, wherein the at least one hinging member further comprises a plurality of hinging members which together define an umbrella-shaped seal disposed on the first end of the piston assembly rod, and each of the hinging members includes a first surface and a second opposing surface.

36. An apparatus as in claim 35. wherein:
    the cylinder interior surface has at least two sections of different circumferences and a stopping surface defining the difference in circumference between the sections; and
    the hinging pushing means is disposed against the cylinder stopping surface.

37. An apparatus as in claim 36. wherein:
    the outlet port is in the smaller of the two different circumferential sections of the cylinder; and
    the umbrella-shaped seal is also disposed within the smaller circumferential section of the cylinder and the plurality of hinging members of the umbrella-shaped seal extend outwardly from the piston assembly rod in a direction substantially towards the stopping surface.

38. An apparatus as in claim 37, wherein:
    the inlet port is in the larger circumferential section of the cylinder; and
    the hinging member pushing means further comprises flanges having recesses through which liquids, pastes, creams or pellets can pass from the larger circumferential section having the outlet port.

39. An apparatus as in claim 35, wherein there are four hinging members on the umbrella-shaped seal.

40. An apparatus as in claim 35, wherein the umbrella-shaped seal further comprises locking tabs and the piston assembly rod further comprises a shoulder which engages the umbrella-shaped seal locking tabs.

* * * * *